United States Patent [19]
Michalon

[11] Patent Number: 4,842,121
[45] Date of Patent: Jun. 27, 1989

[54] COUPLING FOR A CONTINUOUS TRANSPORT SYSTEM

[76] Inventor: Daniel Michalon, 20 rue Gauthier Dumont, Saint Etienne (Loire), France

[21] Appl. No.: 497,896

[22] Filed: May 25, 1983

Related U.S. Application Data

[63] Continuation of Ser. No. 917,557, Jun. 21, 1978, abandoned.

[30] Foreign Application Priority Data

Jun. 23, 1977 [FR] France ................................. 77 20219

[51] Int. Cl.4 ............................................. B65G 23/00
[52] U.S. Cl. ..................................... 198/334; 198/792
[58] Field of Search .................... 198/334, 792; 104/25

[56] References Cited

U.S. PATENT DOCUMENTS 4,066,161 1/1978 Michalon et al. .................. 198/334

Primary Examiner—Joseph E. Valenza

[57] ABSTRACT

A continuous coupling circulating along a closed path and having variable length links each comprising a bogie having at least one bobbin rotated by a wheeled railway system. Successive links are connected by flexible lines which wind on the bobbins and on which are carried vehicles. A supplementary parameter is introduced defined by the ratio of upstream and downstream discharge of the lines from a bogie and permitting suppression of interference phenomena and jerks normally caused by acceleration variations thus improving the comfort of passengers.

7 Claims, 7 Drawing Sheets

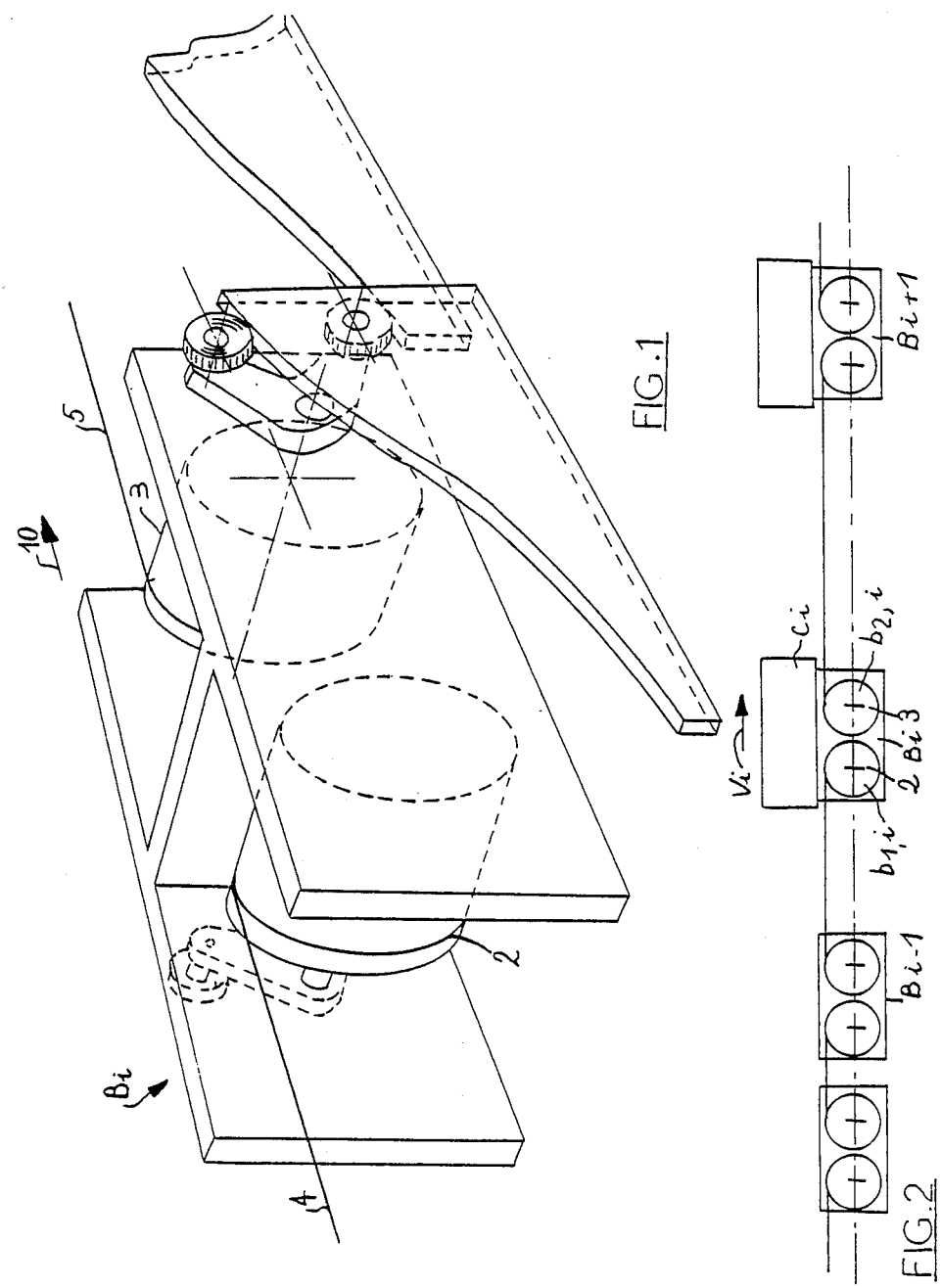

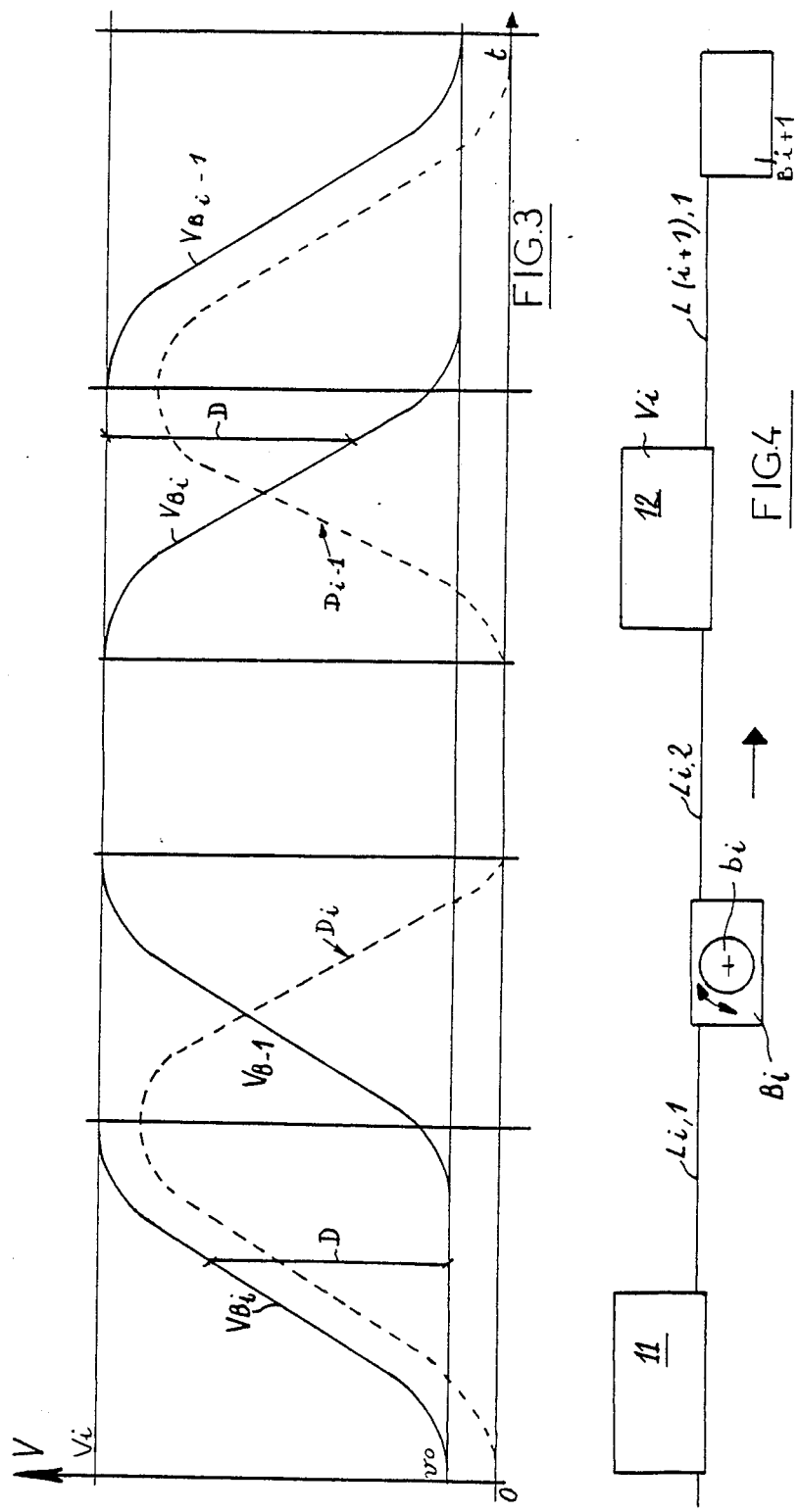

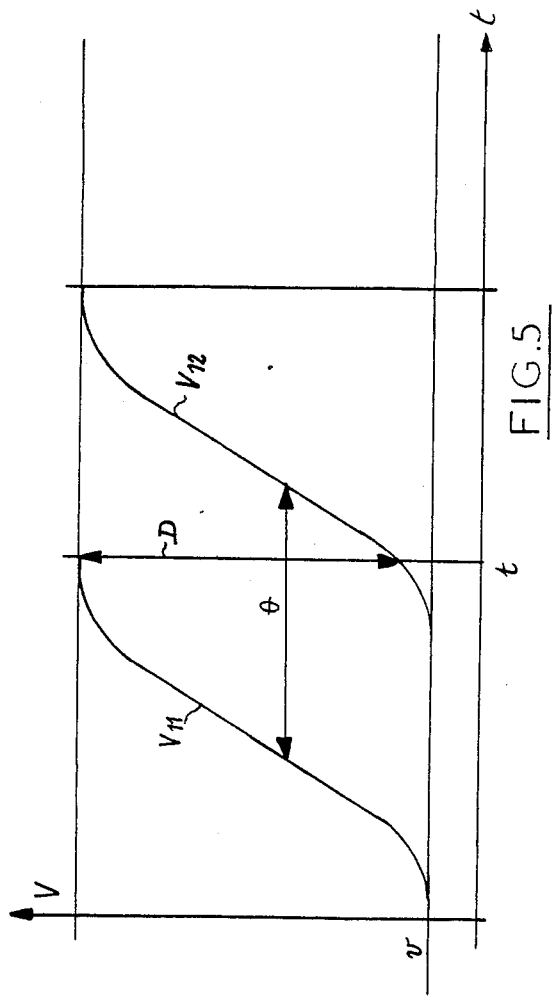

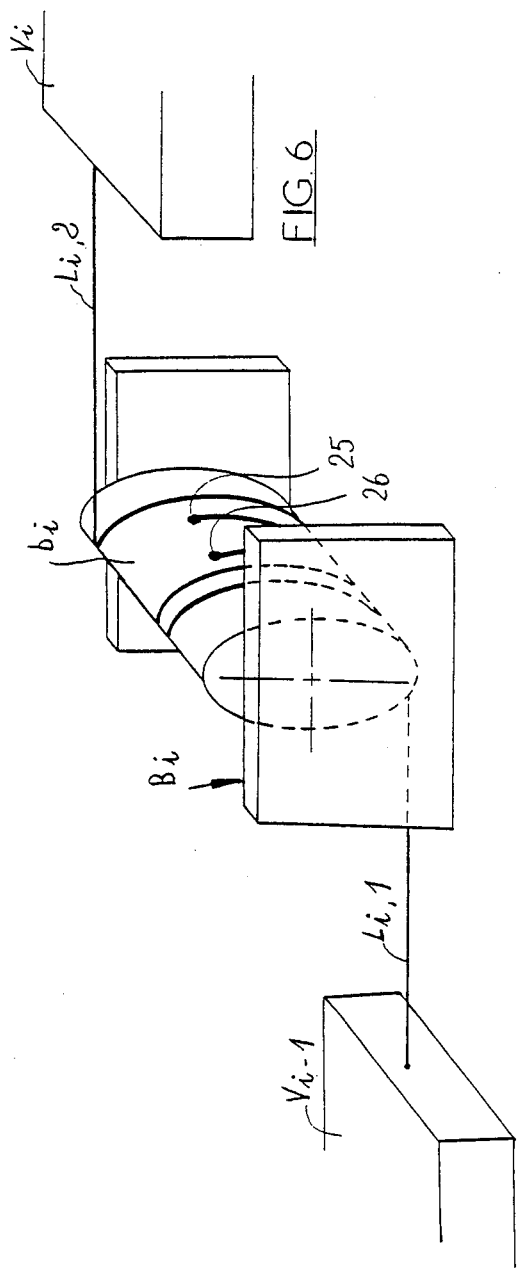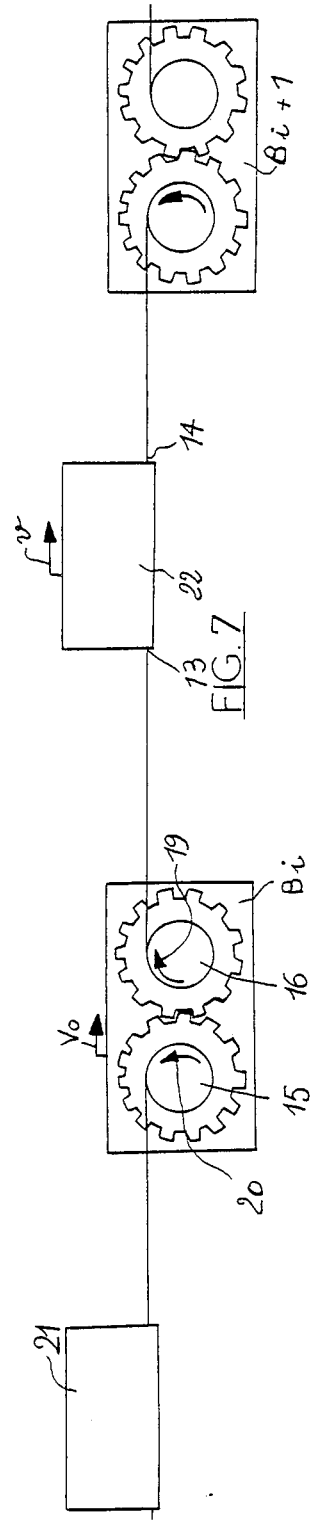

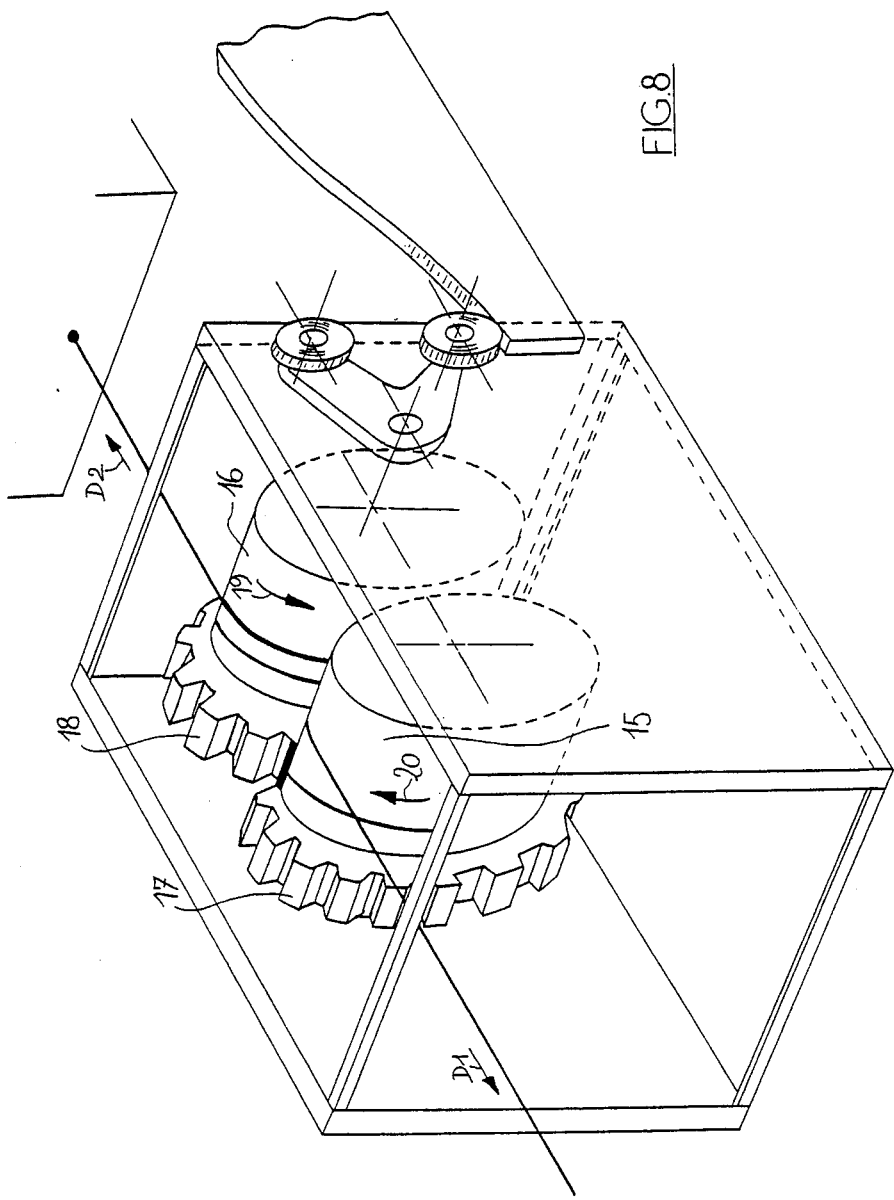

COUPLING FOR A CONTINUOUS TRANSPORT SYSTEM

This is a continuation of Application Ser. No. 917,557 filed June 21, 1978 abandoned.

BACKGROUND OF THE INVENTION

The present invention relates to a continuous coupling having links which form a bogie comprising one or more rotatable bobbins, each bogie being connected to the preceding (or succeeding) bogie by flexible lines which are wound to the bobbins.

There has long been known continuous couplings having links of variable length, which permit the desired speed to be obtained throughout the coupling. Variation in speed is a function of variation in the length of the considered link. Such arrangement is described, for example, in Swiss Patent No. 468292 dated Feb. 15, 1969 (corresponding to U.S. Pat. No. 3,462,002 issued Aug. 19, 1969) and French Patent No. 2236391 dated July 2, 1975 (corresponding to U.S. Pat. No. 4,066,161 issued Jan. 3, 1978).

Such systems are employed in pedestrian and goods transport system and a system of such type is referred to as a semi-continuous system where vehicles decelerate at a station then accelerate.

Different forms of connection are known between the vehicles (cabins or wagons) and the continuous kinematic entrainment coupling. For example, French Patent Application No. 7604526 of Feb. 13, 1976 and U.S. Pat. No. 4,057,017 issued Nov. 8, 197 disclose arrangements in which link length variation is assured by a cable wound on a bobbin carried by a bogie, while the vehicle includes a first part integral with the coupling and a second part connected to a displaceable track. Thus, the second part (or cabin) of each vehicle can be transferred from one location to another by a continuous coupling system comprising several coupling systems.

The present invention provides a novel connection between the vehicle and variable speed continuous coupling to permit the desired speed law to be obtained in the system and to avoid drawbacks in known continuous coupling systems.

One of the main drawbacks is known systems is concerned with the mechanism used to vary the length of the links. This mechanism consists of a wheeled railway system wherein:

the rails are fixed and parallel in the direction of displacement of the coupling; and the wheels are carried by arms or levers integral with the axis of rotation of a bobbin mounted on a bogie of the coupling and rotatable about its own axis.

On the bobbins are wound flexible lines arranged between successive lines of the coupling. The output of the line is controlled by the rotation of the bobbins, i.e., by the inclination of the rail along the path of displacement of the bogies, along a closed path.

When a bobbin rotates too quickly (its rotation is defined by the rolling sliding of its wheel or wheels on the corresponding fixed rail) relative to the speed of movement of the bogie, the said wheel tends to rotate backwards on its inclined rail, at least during a certain period of its rotation. One then observes a phenomenon called "interference" which is indicated by unexpected variations of acceleration. In the transport systems, the vehicles are thus subjected to jerks so that the comfort of the passengers is disturbed. For example, if the rail descends, its slope opposes contra-rotation of the wheel.

There is known to exist the following possible solutions to reduce this interference phenomenon;

(a) the length of the arms carrying the wheels can be reduced so as to reduce the contra-rotation. To obtain a satisfactory result, the lever arm being too weak, there is introduced into the system excessive forces.

(b) by multiplying the number of bogies, the speed of rotation of the bobbins can be limited for a given advance of the coupling. However, this system is costly, heavy and its reliability is diminished.

(c) two bobbins can be mounted on each bogie. These independent bogies limit considerably the speed laws to be obtained without excessively long rails.

SUMMARY OF THE INVENTION

The present invention provides a continuous coupling circulating around a closed path and permitting obtaining of a principle of movement with the aforesaid interference phenomenon.

A continuous coupling, according to the invention, has links of variable length comprising bogies, each provided with at least one bobbin, connected together by flexible lines wound on the bobbins guided by a wheeled railway system, and being characterized in that vehicles are attached to the flexible lines at distinct anchorage points of these lines.

Preferably, this construction introduces to the coupling a supplementary parameter, namely the ratio of output of the lines, on the one hand, in the downstream direction and, on the other hand, from the upstream bogie, while the speed of a vehicle is equal to that of a flexible line and independent of the manner in which the line is discharged, during its displacement, between output from the downstream and upstream bogies relative to the vehicle (or between the upstream and downstream outputs).

Interferences can thus be suppressed in the vehicles by:

causing to circulate more quickly a bogie which must discharge a large quantity of line; and causing to circulate less quickly a bogie with little discharge.

Such construction permits limitation of the acceleration variations of the vehicles. One calls such variations "jerks" whereof the derivation is given by the third derivation of the distance travelled by a vehicle, relative to time. A significant jerk transmits severe disturbances to the passengers.

Preferably, a line has a point of anchorage on a vehicle and a point of anchorage on a rotatable bobbin carried by a bogie. This bobbin discharges cable downstream and upstream. In a modification, a bogie has two bobbins of equal diameter and connected by a gearwheel or the like.

The present invention will now be described by way of example with reference to the accompanying drawings.

BRIEF DESCRIPTION OF THE DRAWINGS

FIG. 1 is a perspective view of a bogie-track with two bobbins steered by a ramp and railwheels.

FIG. 2 shows a series of bobbin-carrying and vehicle-carrying bogies.

FIG. 3 is a graph of the curve $V=f(t)$ compared with the curve $D=f(t)$ for the series shown in FIGS. 1 and 2.

FIG. 4 is a diagrammatic view of couplings according to the invention for transportation by means of vehicles fixed to lines and independent of bogies.

FIG. 5 is a graph showing the speed of a vehicle $V_i$ shown in FIG. 4;

FIG. 6 shows a preferred construction of the couplings according to the invention.

FIG. 7 depicts a variation of the couplings according to the present invention;

FIG. 8 shows a detailed view of a bogie shown in FIG. 7.

DETAILED DESCRIPTION

Figure 9:
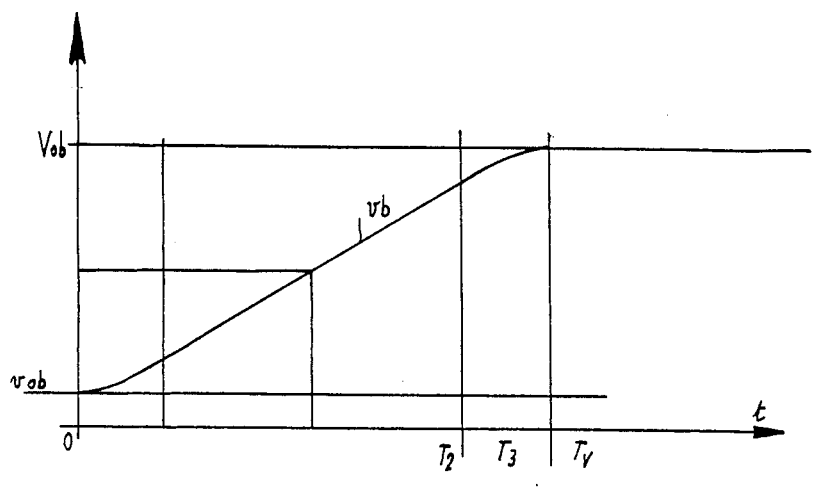
FIGS. 9, 10 and 11 are graphs showing respectively the speed, the jerk, and the acceleration of a vehicle attached to flexible lines between two bogies.

FIG. 1 shows a bogie $B_1$ carrying two rotating bobbins 2 and 3. The upstream bobbin 2 unwinds a line 4 towards the rear, during acceleration of the following coupling in the direction indicated by arrow 10. As can be seen from FIG. 2, the two bobbins of the same bogie $B_1$ are adapted to perform distinct functions. The graph of FIG. 3 shows that this separate bobbin construction permits, between the speed $V_i$ of the bogie $B_i$, which carries a vehicle or cabin $C_1$, and the output of the line from the bobbins 2 and 3, a more favorable relationship of Vi/di to be obtained for the upstream bobbin 2 (or $b_{1,i}$) during acceleration and likewise this relationship is more favorable for the downstream bobbin 3 (or $b_{2,i}$) during deceleration.

This solution follows easily from French Patent Application No. 76 04526 cited above and which is in the name of the present applicant.

The present invention comprises the introduction into the couplings of links of variable length, an additional parameter to limit the phenomenon of interference between the zones of acceleration and the zones of deceleration of the continuous couplings.

The coupling according to the present invention is shown schematically in FIG. 4. It is designed to constitute the kinematic element of a continous transport apparatus. Each link comprises, for example:

a bogie B, provided with at least one bobbin $b_i$;

two flexible lines $L_{i,1}$ and $L_{i,2}$ capable of being wound respectively on the bobbin of a bogie, such that the upstream line $L_{i,1}$ is fixed to an upstream vehicle 11 and the downstream line is fixed to a downstream vehicle 12;

a vehicle $V_i$ (for example the vehicle 12), attached to the free ends of the downstream line $L_{1,2}$ of the links and to the upstream line $L_{(i+1)\,1}$ of the preceding bogie (or upstream bogie $B_{i+1}$ of the series).

It is to be understood that the speed of a vehicle V, equals that of the line $L_{i,2}$ and of the line $L_{(i+1),1}$ and not that of the bobbin-carrying bogie $B_1$. A new parameter is introduced which comprises the relation $D_1/D_2$, $D_1$ and $D_2$ being the output of the line upstream and downstream of a bogie B in relation to a vehicle $V_i$.

If one traces the speed curve of the vehicle 12 as a function of time, one can deduce the speed curve of the vehicle 11 (or $V_{i-1}$) by a simple translation along the abscissa of the graph. The distance of this translation is equal to the constant time interval which, along the length of a variable speed coupling, separates the passage of two consecutive vehicles at a given point, which is their speed at this point. This time interval is called "the temporal point O" of the coupling. In FIG. 5, the relationship of the line between two consecutive vehicles is represented by the vector D, at the time t.

This relationship is imposed by kinematics of the coupling and of the apparatus. According to the invention, the motion of the vehicle is analogous to that of the points 13 and 14 of the flexible lines. The speed V of the vehicle is distinct from the speed $V_o$ of the bogie corresponding to $B_i$. It no longer depends on the fashion in which the discharged line is shared between the upstream and downstream discharged line, $D_1$ and $D_2$ respectively connecting a vehicle to the adjacent bogies $B_i$ and $B_{i+1}$.

If the relationship $D = D_1 + D_2$ is respected, one can dispose entirely of the supplementary parameter formed by the relationship $D_1/D_2$, which allows one to define:

a speed relationship for the vehicles; and a different speed relationship for the bogies.

These distinct relationships permit the vehicles and bogies to respond to different commands which provides comfort for the passengers of the vehicles according to the kinematic and mechanical requirements of the bogies.

In the construction illustrated in FIGS. 7 and 8, each bogie is provided with two bobbins 15 and 16 of equal diameter. These upstream and downstream bobbins are connected to wheels 17 and 18 comprising toothed wheels which form a 1 to 1 gear ratio. Consequently, there is no slip during rotation of the bobbins, which, in any given interval of time, unwind or wind on the same quantity of line. The outputs $D_1$ and $D_2$ are equal.

A known railwheel-ramp system ensures the rotation of at least one bobbin, which entrains the other in a reverse direction (arrows 19 and 20, FIG. 7).

Figure 10:
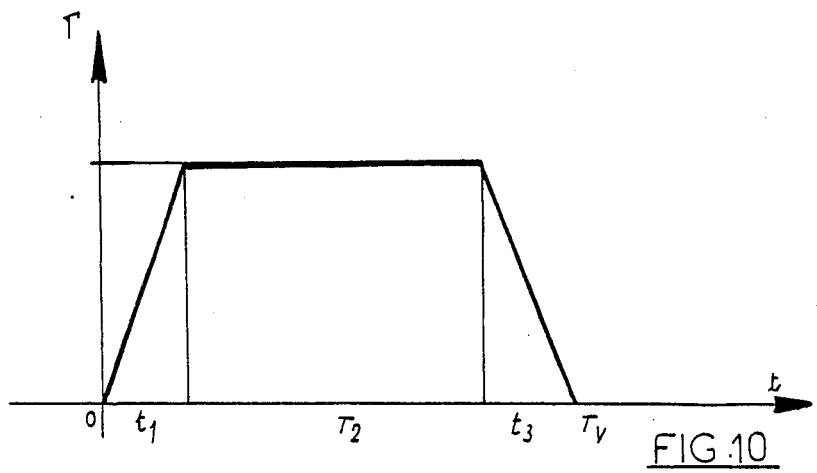
Figure 11:
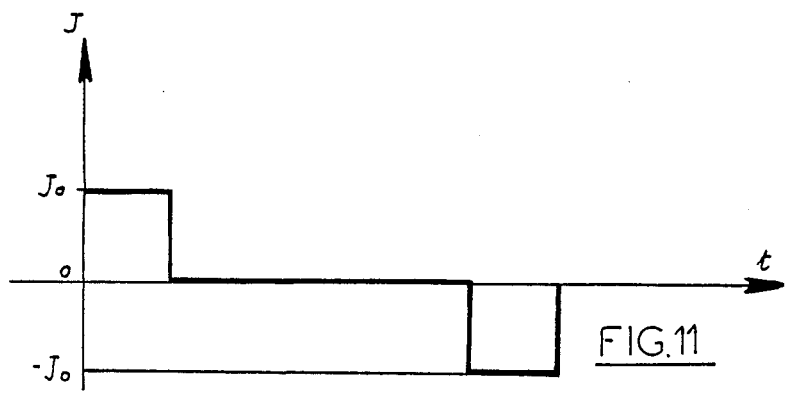

The functioning of such a simple system is shown by the curves of the graphs in FIGS. 9 to 11.

Speed. The upstream output $D_1$ and the downstream output $D_2$ of the lines from the bobbins of a bogie are equal, the speed $V_b$ of this bogie is equal to the arithmetic mean of the speeds of the two vehicles 21 and 22 intercalated upstream and downstream of the said bogie $B_1$.

In order to pass from a smaller speed $V_{ob}$ to a greater speed $V_{ob}$ (acceleration zone), the time $T_V$ is required to permit the vehicles to vary their speed (FIG. 9). During this speed variation, one can distinguish three main intervals:

a first time interval $T_1$, during which the acceleration of the vehicle is increasing;

a second time interval $T_2$ during which the variation of speed is practically constant; and a third time interval $T_3$ where the acceleration diminishes to nothing when the vehicle attains the speed $V_{ob}$.

Acceleration (or Deceleration)

This is represented by the curve $\Gamma = f(t)$ which has a plateau corresponding to the time $T_2$ during which the speed variation is linear. The periods $t_1$ and $t_3$ of acceleration and deceleration are relatively limited (FIG. 10) due to the distribution in the total elevated time, as will be shown later, of the line output between the bogies on one hand and the vehicles on the other hand.

Jerk

As is mentioned above, this term is used to designate the variation in acceleration of the vehicles. It is this phenomenon, represented by the square curve in FIG.

10, which comprises the phenomenon of interference. This phenomenon delimits the duration, and moreover the amplitude $J_o$. The latter is allowed by the discharge of the line of the bogie B, which is governed in the following two ways:

in time, in an interval greater than the time $T_v$ necessary for the coupling to pass from a slower speed to a faster speed, with excessive variation in acceleration which increases the phenomenon of interference; and in space, the output of the line is shared between the upstream output $D_1$ and the downstream output $D_2$. In the represented construction, one has $D_1=D_2=D/2$, D being the total output.

Figure 12:
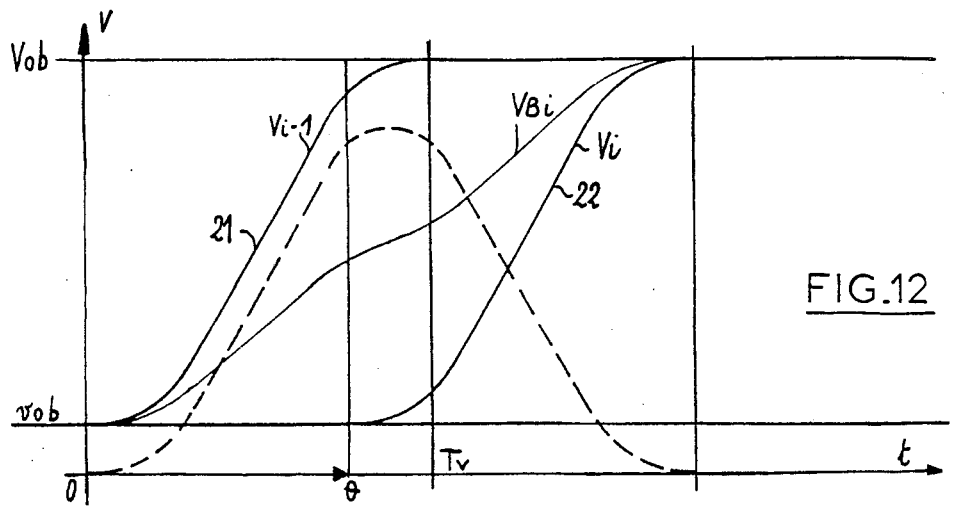
FIGS. 12, 13 and 14 are graphs of curves showing the limit of interference phenomenon in a zone of speed variation of the speed of the couplings.
Figure 13:
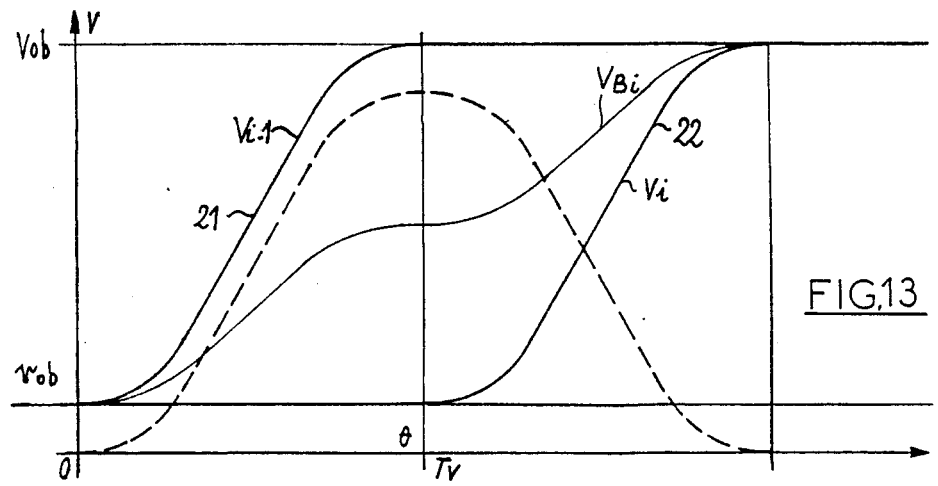
Figure 14:
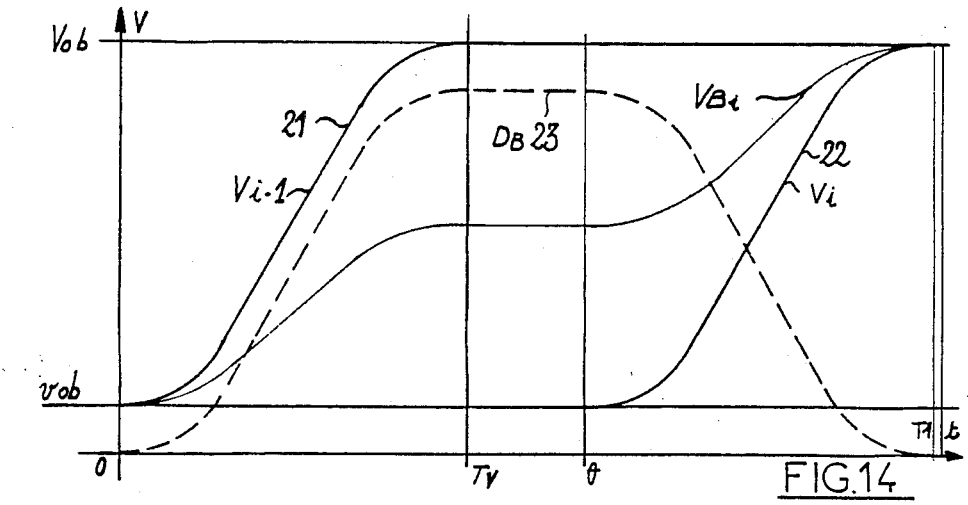

Shown in FIGS. 12 to 14 are the curves concerning the apparatus shown in FIGS. 6 to 8. Each figure shows one of the three possible cases when compared to the "temporal pitch $\theta$" of the coupling with the time interval corresponding to a speed variation zone.

In FIG. 12, the vehicle $V_1$ has not yet attained its maximum speed when the following vehicle passes in front of a given initial point. The time necessary for the variation of speed from $V_{ob}$ to $V_{oB}$ is $T_v$, a time which is greater to the pitch: $T_v > \theta$.

In FIG. 13 $T_v = \theta$, i.e., the time of speed variation is equal to the "temporal pitch".

FIG. 14 shows $T_v < \theta$, and consequently the first vehicle ($v_i$) attains its maximum speed when the following vehicle ($v_{i-1}$) is still at its minimum speed.

In these three graphs represented:

the variation function of the speed of the vehicles $V_{i-1}$ and $V_i$, these representative curves follow one from the other by a translation along the time axis. (curves 21, 22)

the curve representing $V_{Bi} = f(t)$ of the variation of the speed of the bogie $B_1$ which is connected by the lines $L_{i,1}$ and $L_{i,2}$ to the upstream vehicle $V_{i-1}$ and the downstream vehicle $V_i$. At a given instant in time $t_o$, one has, in the construction of FIGS. 6 to 8:

$$V_{Bi} = \frac{V_{i-1} + V_i}{2}$$

The curve 23 (shown in dashed lines) represents the function $D = f(t)$ of the total output of line from the bogie. This function is connected to the curves 21 and 22 by the equation: $D_{Bl} = V_{V_{i-1}} - V_{V_i}$, in the case of apparatus as shown in FIGS. 7 and 8 (two bobbins on the bogie), the output $D_{Bi}$ is shared equally between the upstream output $D_1$ and the downstream output $D_2$. The supplementary parameter $D_1/D_2$, introduced by the kinematics of the couplings of the present invention is then equal to unity.

It will be appreciated that the above arrangement is non-limitative.

The main advantage of the invention is to separate the speed variation of the vehicles on the one hand from the speed variation of the bogies on the other hand. These variations depend only on "the temporal pitch $\theta$" and the comparison between the time necessary to enable a vehicle to pass from one speed to another speed on the one hand, and the total time T, during which the bogies ensure output of the line According to the curves 9 to 11 and 12 to 14:

the total time T1 can be greater than the time $T_v$ during which the speed of the vehicle $V_i$ varies, such that the phenomenon of interference and of "Jerk" (or variation of acceleration) of the bogies are mastered and controlled in such a fashion that the comfort of the passengers is substantially increased (without violent disturbances, shocks etc); and the speed variation or acceleration of the bogies is spread out over a significant duration without reducing the speed variation of the vehicles. Thus, the kinematic forces, the interferences, and mechanical forces on the bogies are relatively reduces without influencing the displacement of the vehicles which follow a separate function of motion.

It will be appreciated that the present invention is not limited to the abovedescribed methods of construction. Moreover, because the main transport systems formed by linking couplings of variable length are known, the means by which the bobbins are rotated, the connection means between successive links, or the driving means for the vehicles have not been described herein.

Finally, another advantage of the separation of bogies and vehicles according to the invention permits whatever speed relationship that is desired to be obtained with a simple system of bobbins.

The construction shown in FIG. 6 shows a simplified construction of a bogie which only carries one bobbin for the flexible lines. The line $L_{i,2}$ unwinds towards the downstream side and is attached to the vehicle (or a preceding bogies). The line $L_{i,1}$ is unwound towards the upstream side and is attached to the vehicle (or to the bogie) following. The two lines are anchored as at 25 and 26 on the bobbin $b_i$ of the bogie. They are wound in such a fashion that they wind and unwind simultaneously on the said bobbin according to the direction of rotation driven by the wheel-ramp system.

The laws of speed variations and accelerations of the bogies and vehicles are similar to those described above. A bobbin of a bogie provides at the same time a downstream unwinding and an upstream unwinding (FIG. 6).

One could equally have a single line L wound double and anchored on the wall of the bobbin.

Moreover, a coupling according to the invention can comprise several types of links.

A link is defined as being an assembly of elements of the coupling between two successive vehicles. Such a link can comprise several bogies and several lines.

This link comprises "elementary links" each constituted by the smallest repetitive part of the link. This elementary link thus comprises a bogie, a vehicle and a flexible line wound on the bobbin of the bogie and attached to the vehicle.

The principal advantages of the invention are obtained by the introduction of the supplementary parameter constituted by independent discharges from an upstream bogie and a downstream bogie connected by flexible lines to vehicles. This construction offers the possibility of acceleration of a bogie which has a large output;

realization of the low of movement desired; and avoidance, as one desired, of the limitation imposed by interference phenomena.

I claim:

1. A continuous coupling for circulation along a closed path, comprising:

variable length links including bogies, each provided with at least one bobbin connected together by flexible lines winding on bobbins guided by a wheeled railway system;

said bogies driving vehicles of a continuous transport system;

said vehicles being secured to said flexible lines at distinct anchorage points on said flexible lines;

said flexible lines and the vehicles traveling at substantially the same speed;

said vehicles being mounted independently of said bogies;

said vehicles having a displacement following a different law from that of the displacement of adjacent bogies;

at least a portion of said vehicle and a portion of said bogies traveling in the same flat predetermined plane;

said flexible lines being disposed parallel to said flat predetermined plane and parallel to the direction of travel of said vehicles in said bogies, except for a portion of the flexible lines which are wound on said bobbins;

the bogie of each link comprising a single rotatable bobbin rotated by a fixture capable of circular motion, having two fingers in a predetermined configuration each having a rail wheel rotatably mounted thereon connected to the bobbin and a fixed rail and on which are wound and anchored two lines, namely a first line which unwinds upstream and a second line which unwinds downstream, the winding of the two lines being simultaneous when the bobbin turns in a given direction.

2. A continuous coupling for circulation along a closed path, comprising:

variable length links including bogies, each provide with at least one bobbin connected together by flexible lines winding on bobbins guided by a wheeled railway system;

said bogies driving vehicles of a continuous transport system;

said vehicles being secured to said flexible lines at distinct anchorage points on said flexible lines;

said flexible lines and the vehicles traveling at substantially the same speed;

said vehicles being mounted independently of said bogies;

said vehicles having a displacement following a different law from that of the displacement of adjacent bogies;

at least a portion of said vehicles and a portion of said bogies traveling in the same flat predetermined plane;

said flexible lines being disposed parallel to said flat predetermined plane and parallel to the direction of travel of said vehicles in said bogies, except for a portion of the flexible lines which are wounded on said bobbins;

each bogie being provided with two applicable bobbins, rotated by a fixture capable of circular rotation, connected to at least one of the bobbins, having two fingers in a predetermined configuration each having a rail wheel rotatably mounted thereon connected to the bobbin and a fixed rail, the downstream bobbin receiving the line unwinding towards the downstream vehicle while the upstream bobbin receives the line whereof the opposed end is attached to the upstream vehicle of the coupling.

3. A continuous coupling for circulation along a closed path, comprising:

a variable length links including bogies, each provided with at least one bobbin connected together by flexible lines winding on bobbins guided by a wheeled railway system;

said bogies driving vehicles of a continuous transport system;

said vehicles being secured to said flexible lines at distinct anchorage points on said flexible lines;

said flexible lines and the vehicles traveling at substantially the same speed;

said vehicles being mounted independently of said bogies;

said vehicles having a displacement following a different law from that of the displacement of adjacent bogies;

at least a portion of said vehicles and a portion of said bogies traveling in the same flat predetermined plane;

said flexible lines being disposed parallel to said flat predetermined plane and parallel to the direction of travel of said vehicles in said bogies, except for a portion of the flexible lines which are wound on said bobbins;

each bogie comprising two bobbins of equal diameter, including an upstream bobbin and a downstream bobbin connected by a gear system or an arrangement for transmitting rotatable movement with a ratio of 1 to 1 so that outputs of the lines upstream and downstream are identical for any given zone of the coupling, the speed of the bogie being then equal to the mean of the speeds of the two vehicles upstream and downstream and connected to the bogie by a line winding on the upstream bobbin and to a bogie connected by a line winding onto the downstream bobbin, respectively, and between which is disposed the coupling.

4. A coupling according to claim 1, in which the spooling or unspooling of the flexible lines between said bogies and vehicles provides a different flow of movement for the vehicles to react off the bogies.

5. A coupling according to claim 1, in which the vehicles are fixed to lines, their speed coinciding, at all points along the path of the coupling, with those of the lines to which they are anchored.

6. A coupling according to claim 2, in which the vehicles are fixed to lines, their speed coinciding, at all points along the path of the coupling, with those of the lines to which they are anchored.

7. A coupling according to claim 4, in which the vehicles are fixed to lines, their speed coinciding, at all points along the path of the coupling, with those of the lines to which they are anchored.

* * * * *

UNITED STATES PATENT AND TRADEMARK OFFICE
CERTIFICATE OF CORRECTION

PATENT NO. : 4,842,121

DATED : June 27, 1989

INVENTOR(S) : Daniel MICHALON

It is certified that error appears in the above-identified patent and that said Letters Patent is hereby corrected as shown below:

Column 1, line 25, change "system" to --systems--;
         line 32, change "197" to --1977--;
         line 46, change "is" to --in--.
Column 2, line 4, change the semicolon to a colon.
Column 3, line 5, change the semicolon to a period.
         line 54, change "$L_{(i+1)1}$" to --$L_{(i+1),1}$--.
Column 4, line 2, change "point 0" to --pitch 0--.
Column 5, line 29, after "graphs" add --is--;
         line 46, change "I" to --i--.
         line 62, after "line" add a period.
Column 6, line 12, change "abovedescribed" to --above described--;
         line 55, after "of" add a colon;
         line 57, change "low" to --law--;
         line 58, change "desired" to --desires--.
Column 7, lines 19 and 20 (Claim 1, lines 27 and 28), change "motion" to --rotation--;
         line 51, (Claim 2, line 24), change "wounded" to --wound--.
Column 8, line 7 (Claim 3, line 3), delete "a".
Before the Abstract, add the following -- --Attorney, Agent, or Firm-- Irving M. Weiner; Joseph P. Carrier; Pamela S. Burt--

Signed and Sealed this

Tenth Day of July, 1990

Attest:

HARRY F. MANBECK, JR.

Attesting Officer

Commissioner of Patents and Trademarks